Feb. 3, 1970

JAMES E. WEBB
ADMINISTRATOR OF THE NATIONAL
AERONAUTICS AND SPACE
ADMINISTRATION
GUIDANCE AND MANEUVER ANALYZER 3,493,665

Filed Aug. 15, 1967

INVENTORS
LEONARD H. DAVIDS
JOHN J. RIBARICH

ATTORNEY

Feb. 3, 1970

JAMES E. WEBB
ADMINISTRATOR OF THE NATIONAL
AERONAUTICS AND SPACE
ADMINISTRATION
GUIDANCE AND MANEUVER ANALYZER 3,493,665

Filed Aug. 15, 1967

INVENTORS
LEONARD H. DAVIDS
JOHN J. RIBARICH
BY
ATTORNEY

United States Patent Office 3,493,665
Patented Feb. 3, 1970

3,493,665
GUIDANCE AND MANEUVER ANALYZER
James E. Webb, Administrator of the National Aeronautics and Space Administration, with respect to an invention of Leonard H. Davids, Woodland Hills, and John J. Ribarich, Manhattan Beach, Calif.
Filed Aug. 15, 1967, Ser. No. 660,841
Int. Cl. C09b 9/02, 19/16
U.S. Cl. 35—10.2                5 Claims

ABSTRACT OF THE DISCLOSURE

A guidance and maneuver analyzer in which a transparent spacecraft simulating sphere is suspended in an aperture in the center of a transparent planor surface, inscribed with various coordinate systems. The sphere has apertures along axes corresponding to the spacecrafts axes and other locations of instruments. Guidance and maneuvers are simulated by rotating the sphere to correspond to maneuver corrections and observing its location with respect to bodies assumed to be aligned along selected coordinates. The sphere and planor surface are suspendable above a base planar surface representing the surface of a body in space so that terminal flight phases may be simulated with respect thereto.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457.

BACKGROUND OF THE INVENTION

Field of the invention

This invention generally relates to a flight simulating device and, more particularly, to a model, useful in displaying and analyzing guidance and maneuver phases of a body along a trajectory, such as a spacecraft in a lunar or interplanetary mission.

The invention will be described, for explanatory purposes, in conjunction with a model used to analyze and display guidance and maneuver phases of a spacecraft in a lunar mission. However, as will be appreciated from the following description, the invention is not intended to be limited to the specific example, but rather is applicable whenever it is desired to display or analyze guidance and maneuver phases of a body in a selected trajectory.

Although most phases of lunar missions are automatically controlled by computer-processed calculations, it is highly desirable to be able to check the effect of such calculated maneuvers on the spacecraft in flight. This may best be accomplished by utilizing a flight-simulating model. Such a model should preferably be one in which a high degree of craft maneuverability can be easily produced to visually demonstrate the effect of such maneuvers. Since on the basis of prior experience, most of the critical maneuvers in lunar flight relate to mid-course velocity correction and to terminal guidance of the craft onto the surface of the moon, it is highly desirable that the model include features, capable of displaying the effect of these different maneuevers on the spacecraft during these particular phases of its flight.

It is also desirable, that such a model include features by means of which trade off between midcourse velocity, maneuvers and various mission constrain, such as antenna patterns may be conveniently and easily determined. The model should also include features by means of which it is possible to analyze terminal descent of the spacecraft with respect to the lunar surface, as well as with respect to bodies in the solar system, such as the earth and the sun and stars to which the spacecraft is locked for navigational purposes during the mission.

OBJECTS AND SUMMARY OF THE INVENTION

It is therefore a primary object of the present invention to provide a model for simulating conditions which exist during the flight of a body along a selected trajectory.

Another object of this invention is to provide a model, easily operable to aid in analyzing various guidance and maneuever phases of a body, such as a spacecraft, in a space mission.

A further object of this invention is to provide a model in which the relative orientation of a simulated spacecraft with respect to a landing surface can be easily changed to conveniently simulate the descent of the spacecraft onto the surface.

Still another object of this invention is to provide a model in which various critical flight parameters can be easily displayed with respect to a simulated spacecraft in order to aid in checking out computations automatically performed for various flight maneuvers.

Still another object of the present invention is to provide a simple, relatively inexpensive model which is useful in visualizing the effects of various maneuvers on a body engaged in interplanetary missions.

These and other object of the invention are achieved by providing a flat sheet of material, preferably transparent in which are inscribed lines, defining various coordinate systems. The material defines an opening or aperture in the center thereof which accepts a clear, transparent sphere. The diameter of this sphere is substantially equal to that of the opening. This sphere is suspended, within the aperture, by a clear plastic support fastened to the sheet of material, so that the center of this sphere is practically aligned in the plane of the material.

The sphere, which represents the spacecraft, is drilled and etched to depict significant features such as various axes of rotation and the axes of antennas and other instruments, assumed to be included therein and vital for the success of the mission. A special key is provided to control the rotation of this sphere along any of the selected axes of rotation thereof, with a protractor which fits around this sphere being used to measure angles of rotation.

The surface of the sheet of material in which this sphere is suspended lends itself to pencil markings, used to define the directions of various bodies, such as the sun, the earth and a selected star, to which the space craft is locked for navigational purposes during its flight. Also, various vector components can be drawn on the board or displayed thereon so that after the sphere is rotated about the various axes, in accordance with the computations automatically performed, the accuracy of such computations, and the orientation of various instruments on the spacecraft, with respect to the earth and other bodies is visually displayable.

The model, may furher include means for supporting the plane in which this sphere is suspended at a variably selected height above a second plane, which can be used to define the lunar surface for analyzing and visualizing the craft's attitude and relationship with the lunar surface during the terminal phases of the flight.

The novel features that are considered characteristic of this invention are set forth with particularity in the appended claims. The invention will best be understood from the following description when read in connection with the accompanying drawings

DESCRIPTION OF THE PREFERRED EMBODIMENTS

Figure 1:
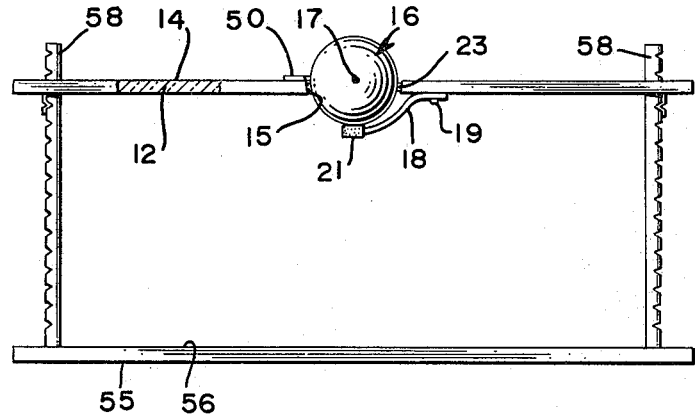
FIGURE 1 is a side view of one embodiment of the present invention.
Figure 2:
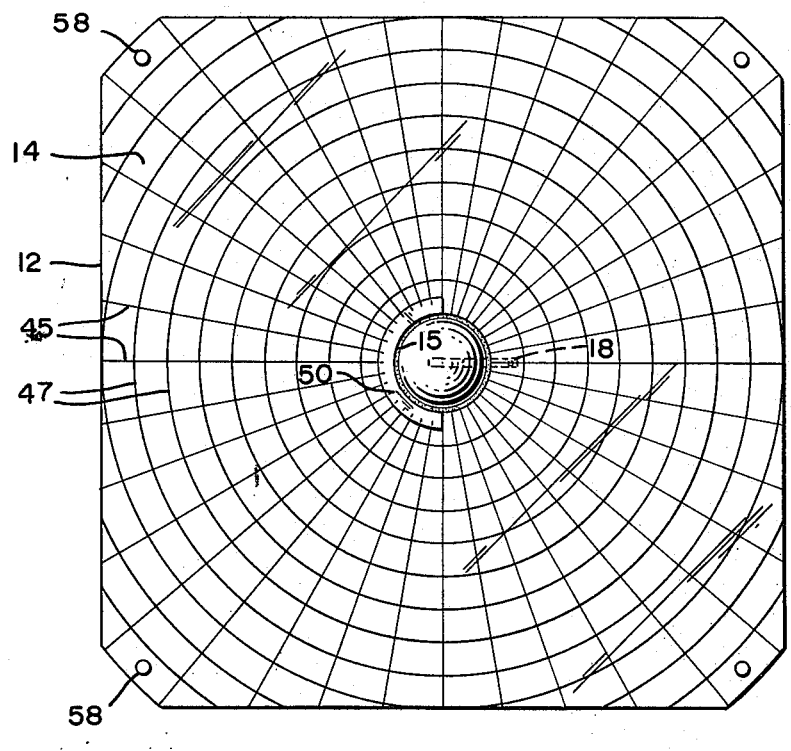
FIGURE 2 is a top view of a surface shown in FIGURE 1.

Reference is now made to FIGURE 1 which is a side view of one embodiment of the invention comprising a sheet of material 12 having an upper surface 14, a top view of which is shown in FIGURE 2 to which reference is made herein. Hereafter, surface 14 will also be referred to as the horizontal plane, although the plane need not be horizontal since the model may be operated in a tilted position. As may be seen from FIGURES 1 and 2, the sheet of material 12 defines a central circular aperture or opening 15. The diameter of the circle is sufficiently large to accommodate a sphere 16 therein, with the center 17 of this sphere substantially aligned in the horizontal plane 14.

The sphere 16 is preferably suspended in opening 15 by a support bracket 18, mechanically coupled to the bottom side of material 12 by an conventional means, such as screw 19. The function of bracket 18 is to support the sphere 16 within the opening, so that it is freely rotatable about the center thereof, while at all times the center is substantially aligned in the horizontal plane 14. To facilitate the rotation of the sphere within the opening, it may be preferred to cover the portion of the bracket 18 coming in contact with the bottom of the sphere with a low friction material 21, such as Teflon, and/or line the periphery of opening 15 with a soft material 23, for example felt or the like.

The sphere which represents the spacecraft is machined to define a plurality of openings, some of which are drilled through the sphere from one end thereof to the other, while others are machined only from the surface thereof to its center. Some of these openings represent axes of rotation of the spacecraft, while others are used to define the location or axes of various instruments, such as, for example the spacecraft's planar array and solar panel.

Figure 3:
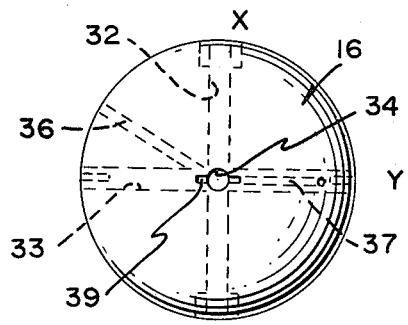
FIGURES 3 and 4 are side views of a sphere shown in FIGURE 1.
Figure 4:
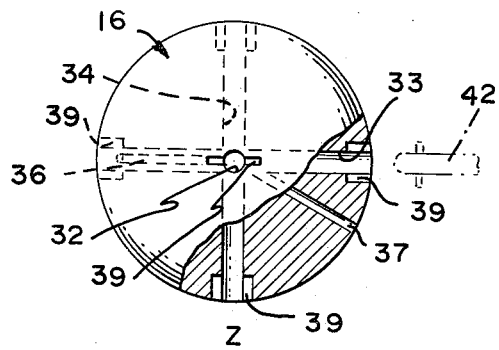

FIGURES 3 and 4, to which reference is made herein, are two different side views of one embodiment of sphere 16 machined to define various axes related to those of the Surveyor spacecraft, which was the first U.S. spacecraft to soft land on the moon. Therein, openings 32, 33 and 34, which extend from one side of the sphere to the other and therefore can be regarded as drilled through, or bored through openings represent the X, Y and Z, axes of rotation of the craft, while openings 36 and 37 represents the axes of two omni-directional antennas of the spacecraft. This sphere may include other openings for defining the locations or axes of various instruments, such as the planar array, so that when this sphere is rotatable in manners to be described hereafter, the relative orientation of such instruments, with respect to various bodies, may be visually displayed.

Figure 5:
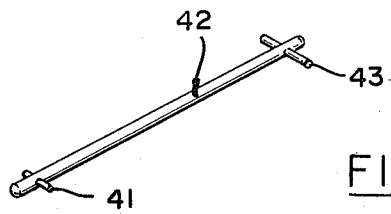
FIGURE 5 is a side view of a key, for rotating the sphere.

The ends of openings 32, 33 and 34 defining the three axes of rotation of this sphere are preferably provided with slots 39, only one of which is shown in FIGURE 4. The function of these slots is to accommodate a locking member 41 of a key 42, diagrammed in FIGURE 5 to which reference is made herein. The function of key 42, which may include a turning handle 43 is to selectively rotate this sphere 16 about its center 17. This is accomplished by locking member 41 within one of the slots 39 and thereafter turning the key so that a desired angular rotation aobout a selected one of the axes is achieved.

As may be seen from FIGURE 2, to which reference is again made, the horizontal plane 14 is provided with coordinate markings. Therein, lines 45 represent angular coordinates with respect to the center of opening 15, while circles 47 represent polar coordinates. Preferably, the sheet of material 12 (FIGURE 1), sphere 16 and bracket 18 are machined or formed of a transparent material so that the interrelationship of the coordinates on surface 14 and the various axes of the sphere are visually displayable above, as well as below surface 14. In a preferred embodiment of the invention, they are all machined of a clear plastic material.

The manner in which the model is operated, of course depends on the particular use made of the model. For example, the effect of various rotational maneuvers of the spacecraft on its orientation with respect to various bodies, such as the sun, the earth and a star, such as Canopus, can be easily displayable by marking the horizontal plane 14 with marks indicating the directions of these various bodies. Then, the various axes of the sphere are aligned with respect to such markings to represent the cruise position of the craft with respect to the bodies.

Thereafter, the various rotational maneuvers, such as roll, yaw or pitch, may be performed by rotating the sphere about the various axes to represent the rotational maneuvers. The final position of this sphere after such maneuvers will clearly display the relationship of the sphere with the various bodies, as well as clearly indicate the orientation of various instruments, with respect thereto. Such a technique is useful in teaching space geometry, as well as checking out the computations made by a computer to determine whether after certain rotational maneuvers will be performed by a spacecraft, instruments such as the antenna will be properly oriented with respect to the different bodies used for controlling the craft's attitude. For example such technique may be used to determine whether, after the maneuvers, the antennas are properly directed towards the earth and/or the solar panels properly oriented towards the sun to receive the solar energy therefrom.

As previously indicated, key 43 (FIGURE 5) is lockable into the sphere through one of its axes to produce the desired rotation. The extent of rotation may be conveniently measured by means of a protractor which fits around this sphere to perform the angle measurements. The protractor is designated by numeral 50 in FIGURE 1. Like material 12 and sphere 16, the protractor is preferably made out of a transparent material so that a changing attitude of this sphere can be continuously visualized as the angular measurements made.

As previously indicated, the most critical maneuvers of a craft in a lunar mission take place at midcourse, when velocity corrections are made, and during the terminal phases of the mission as the craft approaches the surface of the moon. The model of the present invention is particularly useful in checking the various velocity corrections which are calculated by a computer in order to insure that the craft lands at the desired location on the moon, and that the landing meets certain requirements. Also, the computed maneuvers must satisfy various system constraints, such as keeping the antenna pointed in the general direction of the earth. Such midcourse velocity corrections may be displayed by the model of the present invention to check the computer's calculations.

For example, the horizontal plane 14 may be used to display a critical plane, defined as one in which the velocity vector component, which affects the location of the landing of the craft on the moon, is located. A noncritical vector, perpendicular to the horizontal plane 14 is defined as a direction in which a second velocity vector correction component lies. This component is derived from a consideration of the soft landing parameters and is constructed with an appropriate scale.

The velocity component in the critical plane is marked on the horizontal plane 14 in an appropriate scale from the center 17. The vector component in the noncritical direction may be displayed by positioning an object on the horizontal surface 14 at a height related to the scale of the noncritical velocity component. An imaginary line connecting such object with the center of the plane represents the direction of the total velocity correction.

Thereafter, an examination of the sphere's attitude maneuvers is begun by first fixing the attitude of the sphere to represent the cruise mode or attitude of the spacecraft. To accomplish this, it is convenient to measure the direction of the Sun, Earth, Canopus and the Moon in terms of angles with respect to the critical plane and the noncritical direction. These angles are derived from trajectory computation. A protractor 50 (FIGURE 1) and the bored-through openings in the sphere are then used to position objects with respect to surface 14 to represent the desired pointing directions. The sphere is then rotated from the cruise position to a desired pointing direction determined by the computer as necessary for the velocity correction. As the rotation takes place, the various maneuver constraints, such as antenna direction, etc., are considered. The rotation of the sphere 16 is accomplished by utilizing key 42 with the angular rotation being measured by protractor 50. After performing all the attitude maneuvers, i.e. rotating the sphere, its proper alignment with respect to the direction of the total velocity correction is visually seen, thereby providing a check on the computer's calculations.

As herebefore stated, the model of the present invention is also useful to visualize the terminal phases of a lunar mission as a spacecraft approaches the lunar surface. To provide such capability, the model of the invention further includes a base 55 (FIGURE 1), defining a planar surface 56 parallel to and below horizontal plane 14. Material 12 is supported above the base 55 by a plurality of posts 58, which may be preferably notched so that the actual height of plane 14 and sphere 16 above plane 56 may be selectively varied. The surface 56 is preferably etched to define angular and polar coordinates corresponding to those on the horizontal plane 14. Since in the preferred embodiment, material 12 and sphere 16 are transparent, it is apparent that by viewing the model from the top, the coordinates on both surfaces 14 and 56 and the various etched or machined openings in the sphere are easily seen.

To display the terminal phase of the mission, the surface 56 is used to support a projection of the lunar area of interest, so that together with the sphere 16 which represents the spacecraft, a realistic model of the terminal phase is simulated. The surface 14 is used to position the sphere 16 with respect to the base surface 56. As previously pointed out, the support rods 58 are preferably notched to select the height of the sphere 16 and surface 14 above surface 56. Once the sphere is aligned to the desired terminal pointing direction, the effect of the terrain of the moon is quickly ascertainable by looking through one of the borethrough openings or apertures of the sphere.

The desired pointing direction, as determined from the unbraked impact velocity, and initial cruise attitude are preferably represented as marks or objects on the surface 14 similar to that used for the midcourse phase. Once the cruise attitude and pointing direction of the sphere are set up, rotations and the interplay with various constraints are analyzed similar to that of midcourse. The use of the terminal phase simulation readily lends itself to analyzing geometrical considerations after soft landing. Such items as Sun and Earth position in spacecraft coordinates can be quickly estimated for purposes of positioning the solar panel and planar array.

In addition to the foregoing described examples, for using the model, it can be utilized to analyze flyby situations to study or visualize the relationships between areas of the planet surface which may be recorded as a function of different attitude maneuvers. For example, in the present Lunar Orbiter program, the terminal phase simulation may be used to visualize the area photographed by the orbiting craft. This can be accomplished by correctly positioning the sphere and continuously moving a proper projection of the moon on surface 56. By viewing the projection through one of the sphere's bored-through openings, the photographed area is clearly seen.

Figure 6:
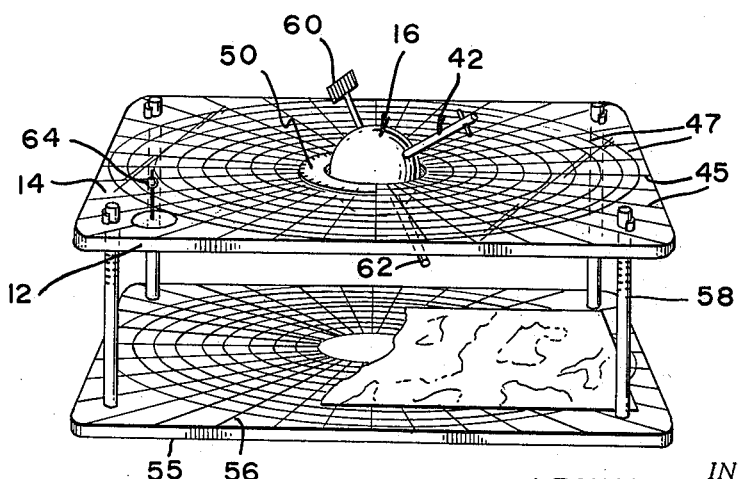
FIGURE 6 is an isometric view of the embodiment shown in FIGURE 1.

FIGURE 6, to which reference is made, is an isometric view of an embodiment of the invention, actually reduced to practice. Therein, numerals 60 and 62 designate a planar array and an antenna respectively. They are inserted in apertures of the sphere 16 which are aligned with the respective axes of these devices in the actual spacecraft. It should be noted that antenna 62 is below the surface 14. However, it is seen from the top due to the transparent qualities of material 12. Also, in FIGURE 6 numeral 64 designates an object which is positionable at a selective point on or above plane 14 to represent a navigational or a vector component used for flight or maneuver simulation, as herebefore described.

There has accordingly been shown and described herein a novel guidance and maneuver simulation model. It is appreciated that those familiar with the art may use the model for purposes, other than those described, as exemplary of the model's usefulness. It should be further appreciated that those familiar with the art may make modifications and/or substitute equivalents in the arrangements as shown without departing from the true spirit of the invention. Therefore, all such modifications and/or equivalents are deemed to fall within the scope of the invention.

What is claimed is:

1. A model for simulating guidance and meaneuvers of a body, comprising:
   a sheet of material defining a reference plane, said material defining a circular opening in the center thereof;
   a sphere representing said body positionable in said circular opening;
   first support means for freely supporting said sphere in said opening with the center of said sphere substantially aligned in said reference plane, with said sphere being free to rotate about its center and about any axis thereof, said sphere defining openings at least one opening which represents an axis of said body extends through said center from one and of the sphere to the other;
   means insertable in any of the sphere's openings for controlling the rotation of said sphere about its center with respect to preselected coordinates on said plane;
   a base plane for supporting thereon map-like means, for representing a selected surface; and
   second support means for supporting said sheet of material defining said reference plane above said base plane, whereby the orientations of the axes of said body with respect to points on said map-like means are determinable by viewing said map-like means through one of the openings of said sphere which extends from one end thereof to the other.

2. The model as recited in claim 1 wherein said sphere represents the body of an interplanetary vehicle, said map-like means representing a selected surface of a planetary body, and said sheet of material further defines a plurality of coordinate lines in said reference plane with respect to the center of said sphere, whereby selected openings of said sphere, representing axes of said vehicle are alignable with selected ones of said coordinate lines, representing directions to reference bodies used for guiding said vehicle with respect to said planetary body.

3. The model as recited in claim 2 further including angle measuring means positionable over said sphere for measuring angles of rotation of said sphere about any of the openings thereof representing axes of said vehicle.

4. The model as recited in claim 2 wherein at least said sheet of material and said sphere are of transparent material, said model further including instrument-representing means insertable in selected ones of the openings in said sphere so that the attitudes of said instrument representing means with respect to said reference bodies and the surface represented by said map-like means are visually displayed as said sphere is rotated to correspond to maneuvers by said vehicle.

5. A model for simulating guidance and maneuvers of a spacecraft comprising:
- a sheet of transparent material defining a reference plane, said material defining a circular opening in the center thereof and a plurality of coordinate lines extending from said center;
- a sphere of transparent material representing said spacecraft positionable in said circular opening;
- support means for freely supporting said sphere in said opening with the center of said sphere substantially aligned in said reference plane, whereby said sphere is free to rotate about its center and about any axis, said sphere defining openings, some openings which represent axes of said spacecraft extend through said center from one end of the sphere to the other;
- means insertable in any of the sphere's openings for controlling the rotation of said sphere about its center with respect to preselected coordinates on said plane, whereby selected openings of said sphere are alignable with selected ones of said coordinate lines which represent spacecraft guidance bodies;
- angle measuring means positionable over said sphere for measuring angles of rotation of said sphere about any of the openings thereof representing axes of said spacecraft;
- instrument-representing means insertable in selected ones of the openings in said sphere so that the attitudes of said instrument-representing means with respect to said spacecraft guidance bodies are visually displayed as said sphere is rotated to correspond to selected maneuvers of said spacecraft;
- a base plane;
- a map of a selected portion of a planet on which the spacecraft represented by said sphere is to land on said base plane; and
- means for supporting said sheet of material with the sphere at a selected height above said base plane, whereby the area on which said spacecraft may land is observable on said map through one of said through openings representing one of the axes of the spacecraft oriented towards said surface.

References Cited

UNITED STATES PATENTS

| | | | |
|---|---|---|---|
| 2,694,859 | 11/1954 | Gwillam | 33—1 |
| 2,949,682 | 8/1960 | Humbert | 35—46 |
| 3,243,897 | 4/1966 | West | 35—46 |

FOREIGN PATENTS

| | | |
|---|---|---|
| 818,428 | 10/1951 | Germany. |

MALCOM A. MORRISON, Primary Examiner

ROBERT W. WEIG, Assistant Examiner

U.S. Cl. X.R.

33—1; 35—43